US011624696B1

(12) United States Patent
Frederickson (10) Patent No.: US 11,624,696 B1
(45) Date of Patent: Apr. 11, 2023

(54) ENVIRONMENTAL SAMPLING CHAMBER (71) Applicant: The United States of America as represented by the Secretary of the Navy, Arlington, VA (US)

(72) Inventor: Kraig Frederickson, Bremerton, WA (US)

(73) Assignee: The United States of America as represented by the Secretary of the Navy, Keyport, WA (US)

(*) Notice: Subject to any disclaimer, the term of this patent is extended or adjusted under 35 U.S.C. 154(b) by 121 days.

(21) Appl. No.: 16/873,796

(22) Filed: Jul. 8, 2020

Related U.S. Application Data (60) Provisional application No. 62/921,998, filed on Jul. 19, 2019.

(51) Int. Cl.
*G01N 15/06* (2006.01)
*B01D 47/02* (2006.01)
*G01N 1/40* (2006.01)
*G01N 1/44* (2006.01)
*B01D 53/18* (2006.01)

(52) U.S. Cl.
CPC ....... *G01N 15/0618* (2013.01); *B01D 47/021* (2013.01); *B01D 53/18* (2013.01); *G01N 1/4077* (2013.01); *G01N 1/44* (2013.01); *G01N 2001/4088* (2013.01)

(58) Field of Classification Search
CPC .... G01N 15/0618; G01N 1/4077; G01N 1/44; G01N 2001/4088
See application file for complete search history.

(56) References Cited

U.S. PATENT DOCUMENTS

2010/0090101 A1 * 4/2010 Schultz .............. H01J 49/142
250/282

FOREIGN PATENT DOCUMENTS

JP 2957917 B2 * 10/1999

OTHER PUBLICATIONS

Edward W. Reutzel, Janice M. Keay, and Christopher A. Sills, "Helicopter Rotor Blade Q-Switched Laser Stripping Emissions Report for NADEP Cherry Point" Applied Research Laboratory, Technical Report 04-012, Sep. 2004 pp. 1-31, The Pennsylvania State University, State College, PA.
Todd L. Manning and Chris Murray, "Industrial Hygiene Survey Report" Project No. IHRI160192.00, Dec. 20, 2016, pp. 1-61. The EI Group, Inc., Glen Allen, VA.
Andrew L. Gloven, "Evaluation of Hand-Held Laser De-Painting System" Memorandum For Air Mobility Command (AMC), Consultative Letter AFRL-SA-WP-CL-2017-0007, Aug. 18, 2017, pp. 1-48, U.S. Air Force School of Aerospace Medicine (USAFSAM), Wright-Patterson AFB OH.

(Continued)

*Primary Examiner* — David Z Huang
(74) *Attorney, Agent, or Firm* — Stephen J. Leahu; Naval Undersea Warfare Center (57) ABSTRACT

An environmental sampling chamber for sampling the particulates and substances emitted from a test sample when the surface of the sample is ablated. The sampling chamber avoids the need for clean rooms and other expensive testing apparatus and can be used to test a variety of materials in accordance with standard measurement procedures. Use of the testing chamber and methods assists with safety and risk evaluation in applications such as painting and removal of coatings.

9 Claims, 10 Drawing Sheets

(56) References Cited

OTHER PUBLICATIONS

Edward W. Reutzel, Janice M. Keay, and Christopher A. Sills, "Helicopter Rotor Blade Q-Switched Laser Stripping Emissions Report for NADEP Cherry Point" Applied Research Laboratory, Technical Report 04-012, Sep. 2004 pp. 1-54, The Pennsylvania State University, State College, PA.

* cited by examiner

PRIOR ART

PRIOR ART

FIG. 8. H

ENVIRONMENTAL SAMPLING CHAMBER

CROSS REFERENCE TO OTHER PATENT APPLICATIONS

The present application claims the benefit of U.S. Provisional Patent Application Ser. No. 62/921,998 filed 19 Jul. 2019 and titled: Environmental Sampling Chamber, the complete disclosure of which is incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Removing coatings or the top large layer of materials from surfaces can result in particulates becoming airborne and being inhaled by workers or other personnel or bystanders. This situation most commonly occurs when removing a coating or paint from a surface via scrapping or other mechanical means but can also occur via erosion and exposure when the surface is exposed to the elements. Depending upon the method of surface removal, chemical reactions can also occur which may alter the chemical composition of the particulates created as the coating or surface material is separated from the underlying substrate material. For each of these reasons, environmental safety and hazard analysis are conducted to determine and better understand the particulates, carcinogens, biohazards, or gases released as the coating or surface layer is removed. These tests assist in identifying any health and safety risks arising from contact with or inhaling the released particulates or gasses; and to define exposure limits and any personal protective gear required.

In industry, such tests are sometimes conducted in large environmental clean rooms. Clean rooms are expensive to use and operate. Large clean rooms require operators to use specialized full body personal protective equipment ablating or removing the top surface coating in the clean room environment introduces an excessive amount of airborne contaminants into the clean room environment. Such tests are therefore costly and impractical to conduct in such settings. Returning a clean room to clean status after a test requires large amounts of neutralizing solution and cleaners after each use or test run.

Figure 1:
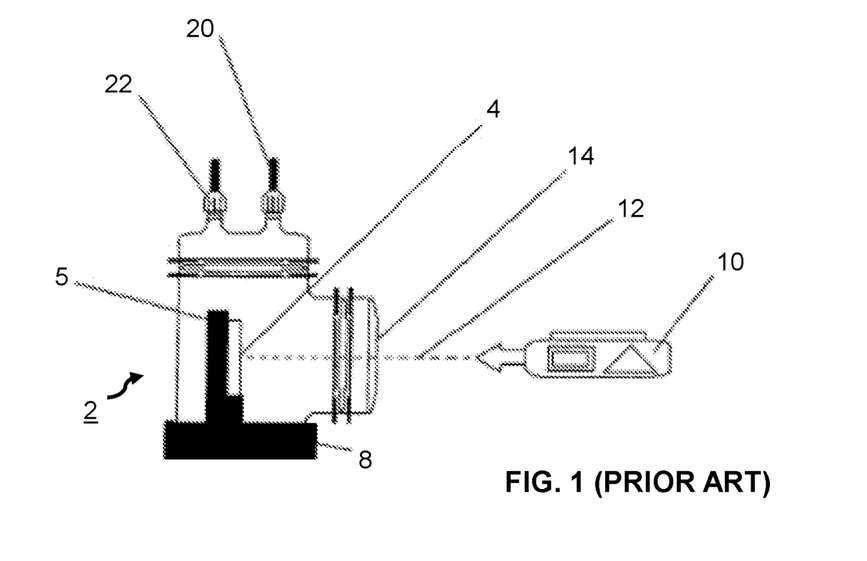
FIG. 1 is a side-view of a prior art collection vessel.

For these reasons, industry has sought smaller self-contained test devices. FIG. 1 shows a side view of a prior art collection vessel 2. Prior art collection vessel 2 bears resemblance to a standing cylinder in which a test sample 4 is mounted on a plate 5 fixed to a base 8. An ablation tool 10, which can be for example a laser, sends a beam of directed energy 12 through lens 14 directed at sample 4. The distance and energy of ablation tool 10 is fixed by the optics of lens 14 and the fixed distance of test sample 4 from lens 4.

Figure 2:
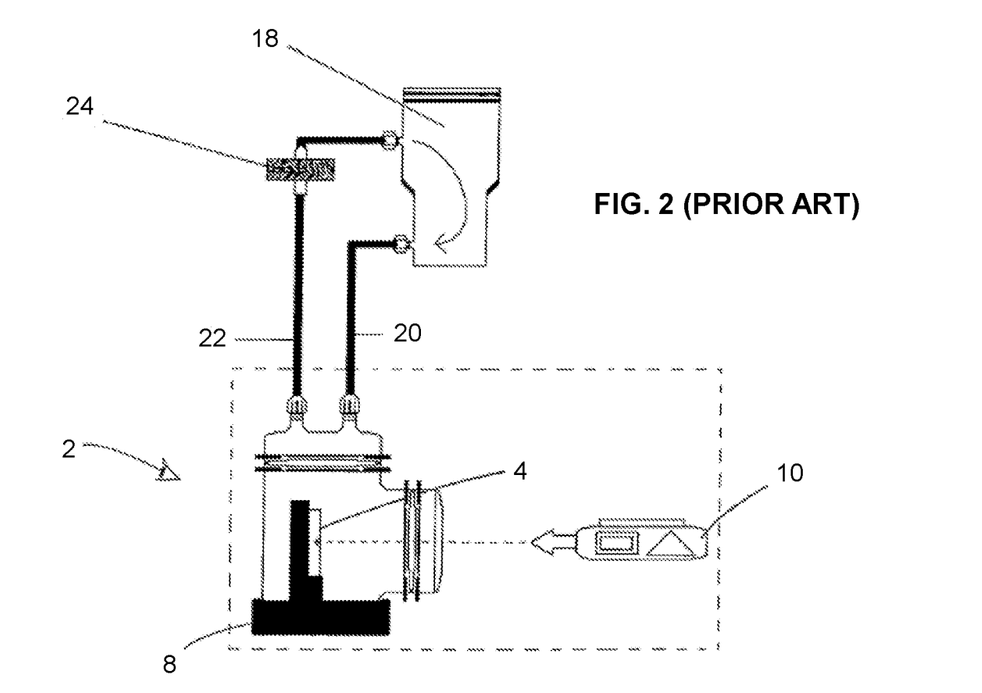
FIG. 2 is a schematic view of a test configuration illustrating the operation of the prior art collection vessel of FIG. 1.

As shown in FIG. 2, air circulates through vessel 2 as supplied by circulation pump 18 via input port 20 and exit port 22. When directed energy beam 12 hits test sample 4, the beam ablates the sample 4 generating particulates which become airborne within the interior volume of vessel 2. A sample collector filter 24 catches the airborne particulates ablated off test sample 4. The material collected in filter 24 can then be analyzed according to industry best practices and analysis protocols. One such Standard Operating Procedure is Air Sampling for Metals, published by Scientific, Engineering, Response and Analytical Services, SERAS, SOP 2119, Rev 1.1. The entire text of which is incorporate herein by reference.

In prior art devices, only two ports 20 and 22 are provided. This limitation can adversely impact the circulation and flow such that best practices for the collecting and analyzing byproducts may not be met. In particular, the prior-art collection device of FIGS. 1 and 2 clogs easily and does not support industry standard guidelines or best practices for collecting diluted or concentrated samples.

In addition, the collection vessel does not allow for adjustment of the ablation tools in relation to the test sample and optical window combination. If this combination fails to focus enough energy on the test sample, the amount of time necessary to run a test is extended. Increasing the time necessary for a test increases costs. Failure to focus enough energy may possibly not be reflective of the actual removal practice in the field.

Increasing the energy focus on the sample by moving the ablation tool closer to the test vessel 2 is impractical. If the ablation tool moves forward closer to the test sample test vessel 2, damage to vessel 2 is potentially catastrophic. The fixed position of the test sample in the prior art device; FIGS. 1 and 2 relative to the optical window thus limits the numbers of useful test configurations and hence the number and types of materials and levels of energy that can be tested. Tools too close or too far away from the test sample adversely impact the test procedure, test results, and the possibility the device will experience clogs.

SUMMARY OF THE INVENTION

The present invention includes recognition of the problems and limitations of prior art devices. The environmental chamber of the present invention is easily adjustable, self-contained, and configurable. According to one aspect of the invention the environmental chamber can be configured into multiple lengths to better manage circulation within the test chamber and to manage the amount of energy directed at the test sample. Attaching chambers together increases the total distance between the test sample and the ablation tool and reduces the possibility of damage to the chamber.

According to another aspect of the invention, the environmental chamber includes multiple inlet/outlet ports. Multiple ports manages air circulation and assists in the prevention of clogs. The Environmental Protection Agency (EPA) has documented a potential problem with the sampling method of the prior art due to particulate overloading the filter. In one embodiment of the present invention, the invention provides an expansion capability for additional ports by standardizing the ends that connect to the main chamber body. Different end pieces with different numbers of ports or other tools or interfaces may be attached. Reducing filter clogging and improving circulation parameters also reduces the possibility of biased low results and produces a more accurate representation of the particulate and off gassing load likely to occur under real world conditions.

According to other aspects and features of the present invention, the invention reduces test costs and labor. Full body personal protective gear is no longer a requirement since hazards are contained within the sealed environment of the test chamber. The configurable nature of the chamber easily enables one to meet different test condition requirements and to accommodate different types of samples or sample material without designing or constructing a new test apparatus.

Further advantages and features of the present invention will be described in detail below.

BRIEF DESCRIPTION OF THE DRAWINGS

Like reference numerals refer to similar elements or features throughout the drawings.

DESCRIPTION OF EXEMPLARY EMBODIMENTS OF THE INVENTION

FIG. 1 shows a side view of a prior art collection vessel 2. Prior art collection vessel 2 bears resemblance to a standing cylinder in which a test sample 4 is mounted on a plate 5 fixed to a base 8. An ablation tool 10, which can be for example a laser, sends a beam of directed energy 12 through lens 14 directed at sample 4. The distance and energy of ablation tool 10 is fixed by the optics of lens 14 and the fixed distance of test sample 4 from lens 14.

When directed energy beam 12 hits test sample 4, the beam ablates the sample 4 thereby generating particulates, gasses, or other matter which become airborne within the interior volume of vessel 2. As shown in FIG. 2, air circulates through vessel 2 as supplied by circulation pump 18 via input port 20 and exit port 22. A sample collector filter 24 catches the airborne particulates ablated off test sample 4. The material collected in filter 24 can then be analyzed according to industry best practices and analysis protocols. In prior art devices, only two ports 20 and 22 are provided. This limitation can adversely impact the circulation and flow such that best practices for the collecting and analyzing byproducts may not be met.

Figure 3:
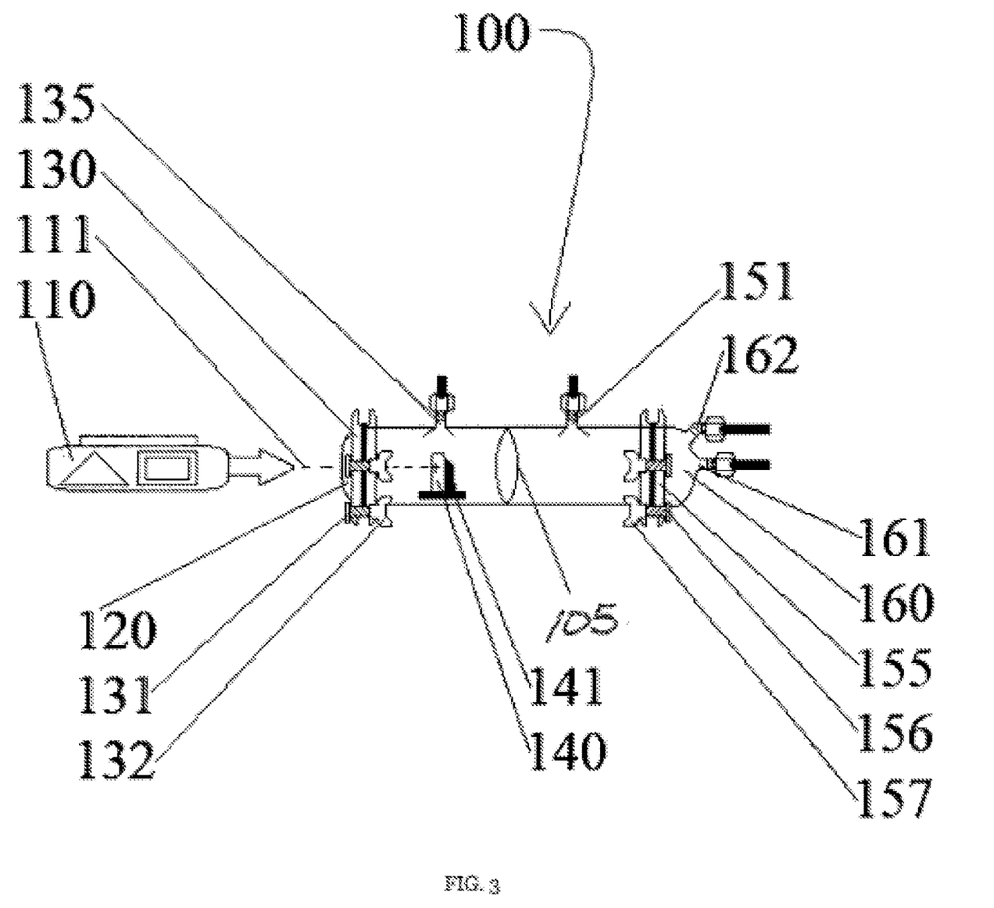
FIG. 3 is a side-view representation of an environmental chamber according to an embodiment of the present invention.

FIG. 3 shows an environmental chamber 100 according to an embodiment of the present invention, which is comprised of glass in a long cylindrical shape. A number of suitable materials, known to those of skill in the art, may also be used to construct the cylindrical body of chamber 100. Glass has several advantageous properties including clarity, non-conductivity, chemically safety and stability, ease of manufacture, and availability.

Chamber 100 may optionally be formed by joining multiple cylinders together to form a larger, more elongated, tube. These sections may be joined by a variety of means known to those of skill in the art. FIG. 3 shows sections joined together using a fusion weld 105.

Chamber 100 is further constructed to include an optical window 120. Optical window 120 attaches to environmental chamber 100 via a clamping mechanism. Optical window 120 allows directional energy emitted from ablation tool 110 to pass and be directed onto the test sample. Optical window 120 is preferably fabricated to minimize imperfections which could reduce energy absorption and interfere with beam transmission as the energy passes through window 120 and into chamber 100.

Chamber 100 further includes an inlet/outlet ports 135 and 151 formed as part of the glass body of chamber 100. Ports 135 and 151 further include a threaded connection for mating with flexible tubing such as, for example, a hose. Another clamping mechanism 155, secures an endcap 160. Clamping mechanism 155 secures via bolts 156 and wingnuts 157 which can be hand tightened. Endcap 160 includes both inlet/outlet port 161 and inlet/outlet port 162 both of which have industry standard threads for interconnection of hoses or other peripherals.

Interaction of directed energy in toward test sample 140 causes potentially hazardous byproduct to disperse, not escape, environmental chamber 100. The location of test sample 140 is adjustable, within any chamber 100 configuration, through placement of movable test plate holder 141, which rests on the inside of environmental chamber 100.

Figure 4A:
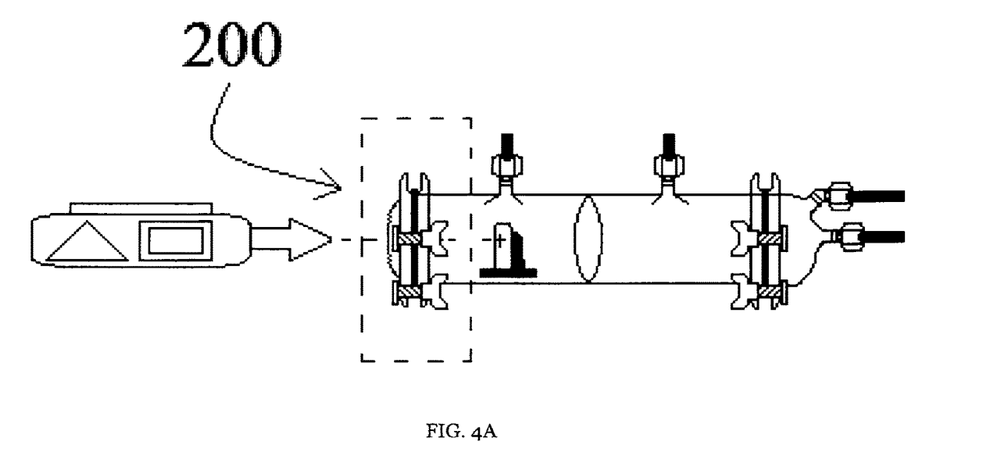
FIG. 4A is a side-view representation of an environmental chamber according to an embodiment of the invention highlighting a location and construction of a clamp assembly.
Figure 4B:
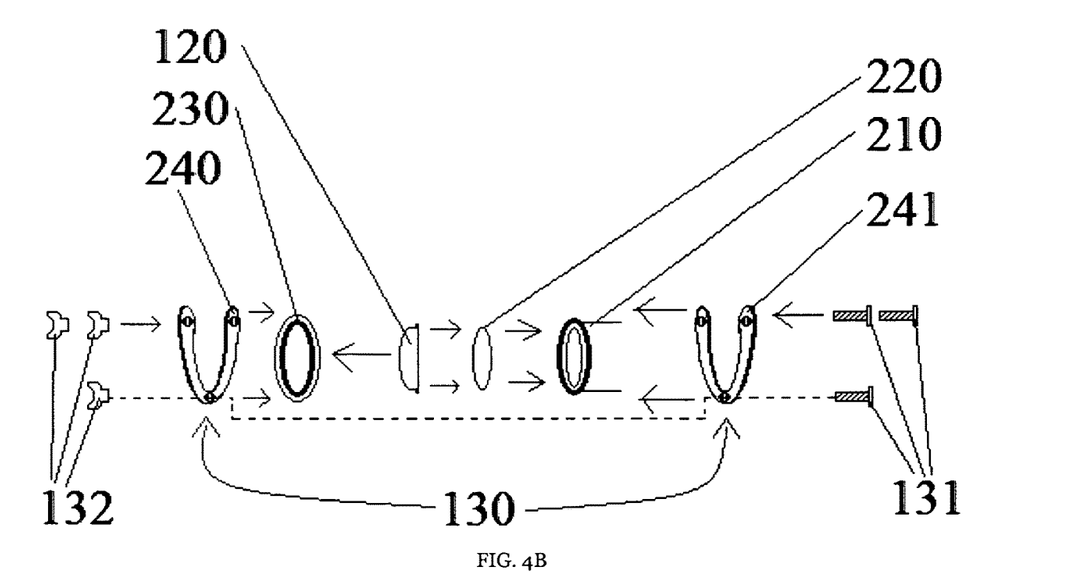
FIG. 4B is an exploded view of the clamp assembly highlighted in FIG. 4A according to an embodiment of the present invention.

FIGS. 4A and 4B show attachment 200 of optical window 120 in greater detail. Starting at one end of environmental chamber 100 is a protruding lip 210, comprised of glass, on the outside edge, allowing varying items a place to clamp to, and includes a channel for gasket 220 to fit in. Optical window 120 rests against gasket 220 sealing one end of environmental chamber 100. The majority of optical window 120 is visible since only the outer edge of optical window 120 fits a reinforcement bracket 230. Reinforcement bracket 230 is round in shape, includes a coating preventing damage to optical window, and extends enough to mate with protruding lip 210. Clamping mechanism 130 includes u-shaped clamp 240, available in different materials, with three holes for even compression, and compresses the furthest end towards environmental chamber 100. An identical u-shaped clamp 241 fits around the environmental chamber 100 and catches protruding lip 210. Bolts 131 fit through holes on u-shape clamp 241 passing through u-shape clamp 240, where wingnuts 132 secure to bolts 131 keeping components in place. Hand tightening prevents glass breakage.

Figure 5A:
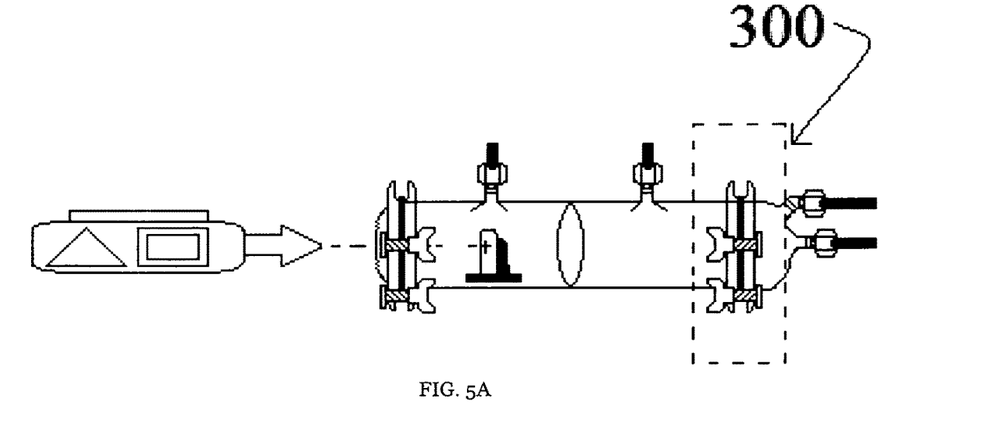
FIG. 5A is a side view of an environmental chamber according to an embodiment of the present invention showing a location and construction of a second clamp.
Figure 5B:
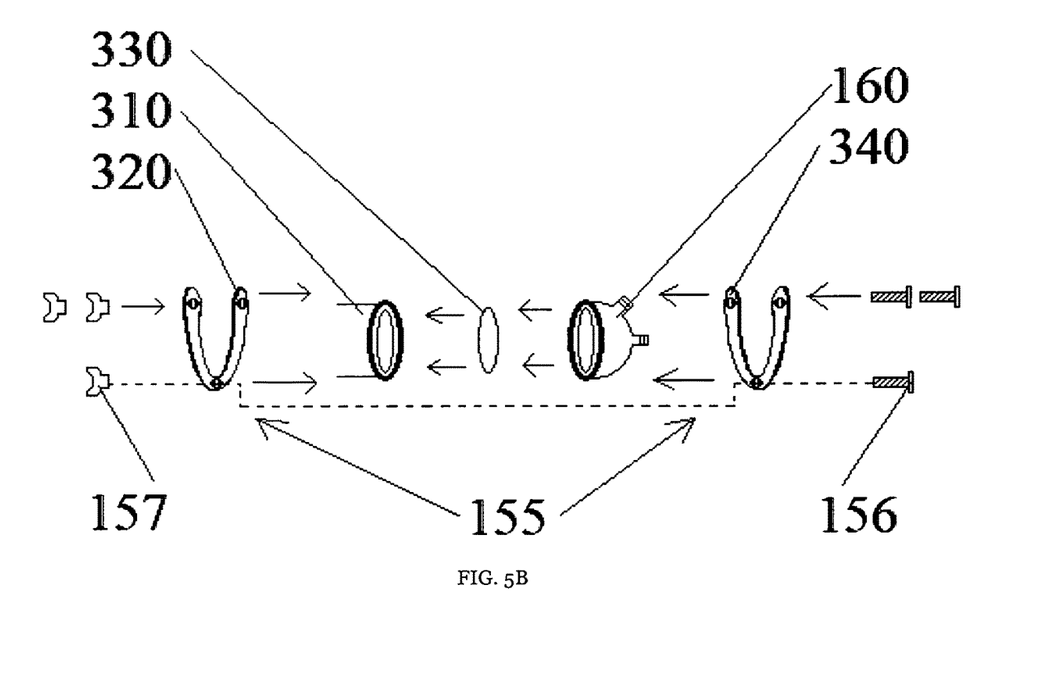
FIG. 5B is an exploded view of the clamp located in the highlighted portion of FIG. 5A according to an embodiment of the present invention.

FIGS. 5A and 5B show endcap attachment 300 to environmental chamber 100. Clamping mechanism 155 is similar to optical window attachment 200 and works in the same fashion. A protruding lip 310, comprised of glass includes, on the outside edge, a u-shaped clamp 320 which fits snugly around environmental chamber 100 and slides outward catching on protruding lip 310. Protruding lip 310 allows varying items a place to clamp to, and includes a seating channel for gasket 330. Endcap 160 rests against gasket 330 thus sealing the end of environmental chamber 100 and extends enough to mate with protruding lip 310. U-shaped bracket 340 fits around endcap 160, but catches the edge closest to environmental chamber 100. Three holes on u-shape clamp 340 match the orientation of u-shape clamp 320 through which bolts 156 pass. Bolts 156 join u-shaped clamp 340 and u-shaped clamp 320 as shown. Wingnuts 157 are hand-tightened to secure bolts 156. Following the clamping procedure shown in any of FIGS. 4A-5B allows several sections of environmental chamber 100 to be joined together, to achieve any possible length, optical window, or endcap configurations.

Figure 6:
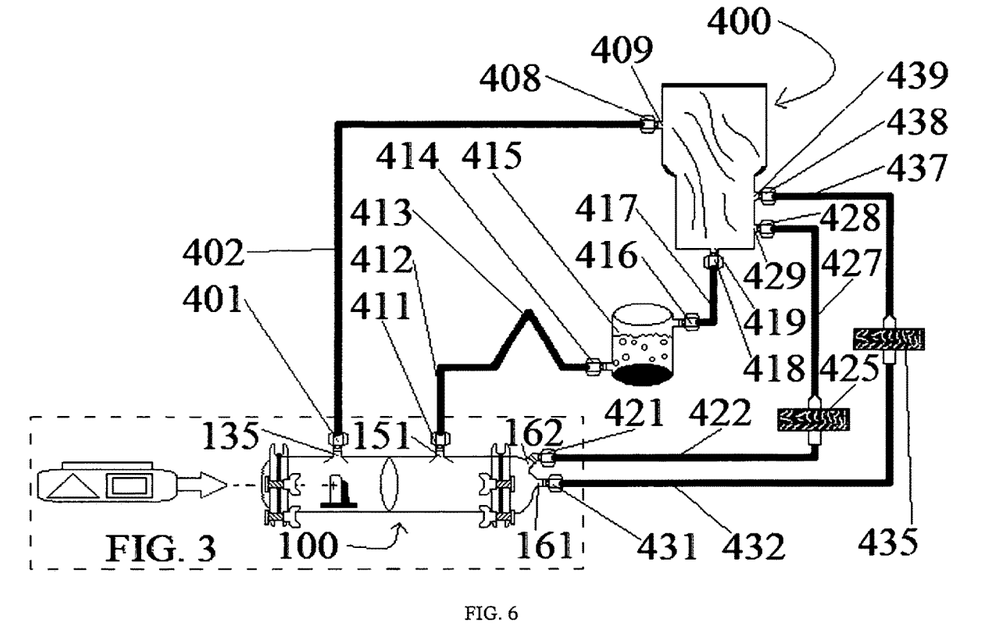
FIG. 6 is a schematic showing the environmental chamber of FIG. 3 in a test configuration according to an embodiment of the present invention.

FIG. 6 shows the environmental test chamber of FIG. 3 in a test configuration and the interconnection of input/output ports: 135, 151, 161, and 162 to circulation pump 400. Pump 400 is circulates any fluid medium through environmental chamber 100, to carry matter ablated from test sample 140 for collection by filters 425 and 435. Pump 400 supplies fluid to chamber 100 via inlet hose or tube 402 and couples to inlet port 135 using a hose connector nut 401. Hose 402 secures to pump 400 using a connector nut 408 coupled to circulation port 409.

Outlet port 151 uses a hose connector nut 411 to secure one end of hose 412 to environmental chamber 100. A liquid backflow prevention 413, constructed via techniques well known to those skill in the art, couples a solution apparatus 415 via nut 414. Solution apparatus 415 contains a solution for capturing gas or particulate matter for further testing. The composition of the solution varies according to the specific gas or chemical matter wished to be captured or likely to be contained in the materials ablated from the sample. The composition of such solutions for capturing particular gases and chemicals is well known to those of skill in the art.

Hose connector nut 416 attaches hose 417 to the opposing end of solution apparatus 415. Hose 417 couples hose connector nut 418 to circulation port 419. Outlet port 162 also has a hose connection nut 421 to couple hose 422 to environmental chamber 100, while hose 422 slides onto one end of a filter apparatus 425.

Filter apparatus 425 comprises an interchangeable fiber filter for capturing variable size particulate matter at a micron level. Circulating fluid passes through filter 425 and through hose 427 which couples to circulation pump 400 using hose connector nut 428 at circulation port 429. Outlet port 161 has a hose connection nut 431 that hose 432 to environmental chamber 100. The opposing end of hose 432 slides onto one end of a filter apparatus 435. According to one possible embodiment of the invention, fiber filter apparatus 435 comprises a second type of fiber designed to capture a different micron size particulate than fiber apparatus 425.

Figure 7:
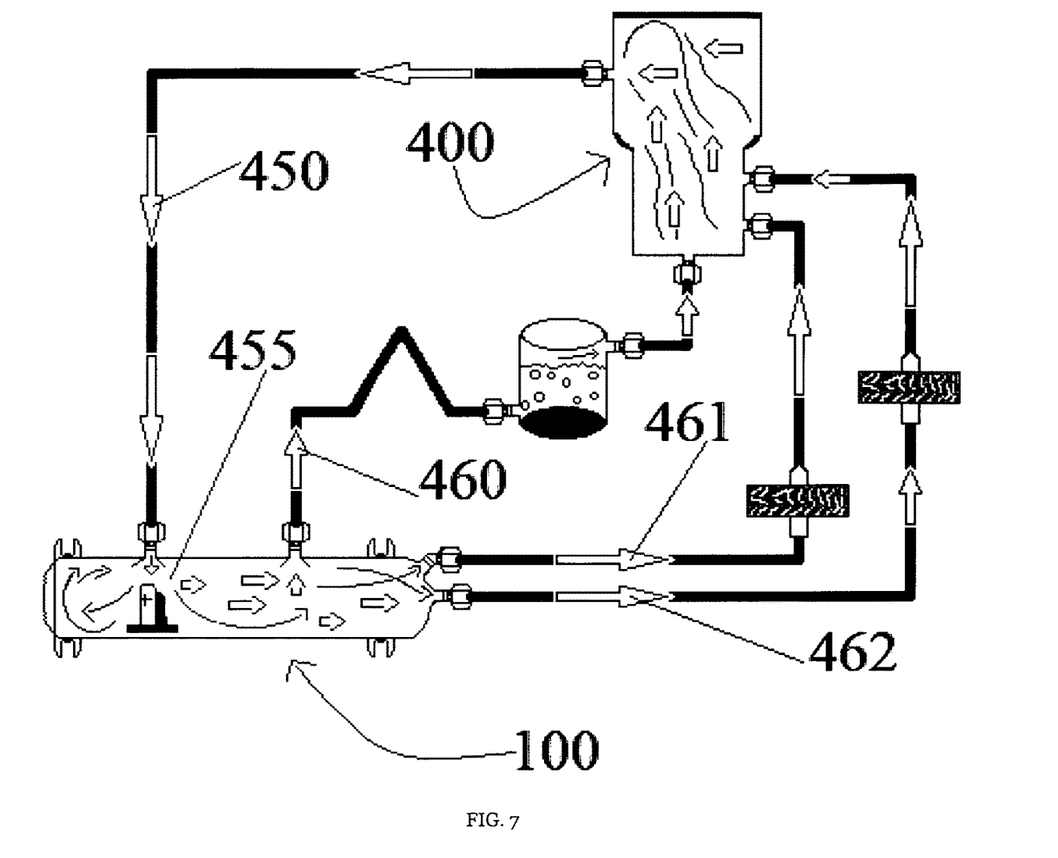
FIG. 7 is a diagram of air flow during operation of an environmental chamber according to an embodiment of the present invention.

Circulating fluid passes through filter 435 and returns to circulating pump 400 via hose 437 secured using a hose connector nut 438 to circulation port 439. When all the aforesaid connections are made the system forms a closed loop of circulating fluid as diagramed in FIG. 7.

FIGS. 8A through 8H compare environmental chamber 100 and prior art vessel 2 and show the concentration levels of directed energy 120 and the resulting test samples results as a function of adjusting the distance configuration of ablation tool 110. In a first configuration shown in FIGS. 8A and 8B the optical windows 111 and 505 of each device both sustain damage. The focus beam patterns 511 and 512 illustrate the concentration of directed energy passing through the optical windows. This energy beam pattern causes the damage to the optical window in both vessel 2 and chamber 100.

Figure 8A:
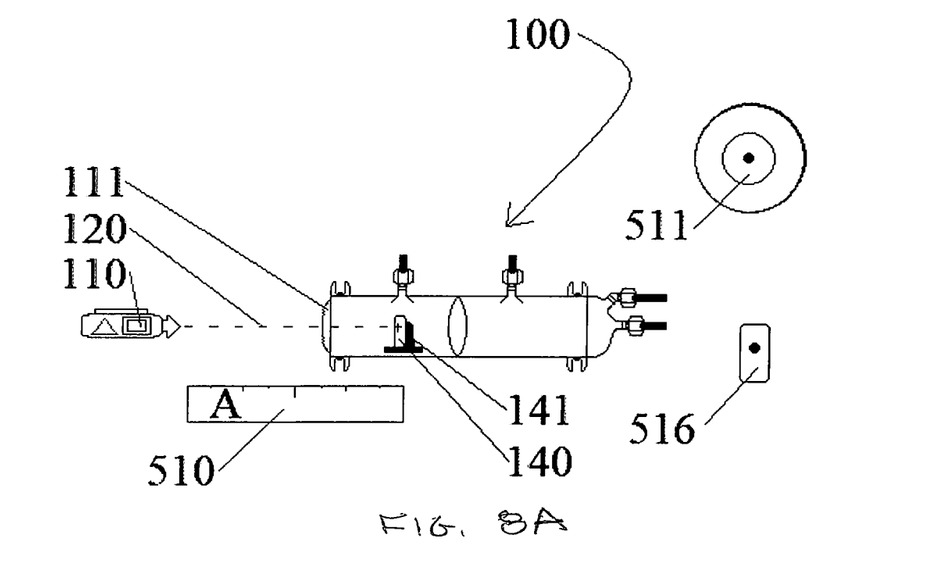
FIGS. 8A and 8B are partial side-views of an environmental chamber according to an embodiment of the present invention, as well as the prior art test chamber of FIG. 1 illustrating differences in operation and results.
Figure 8B:
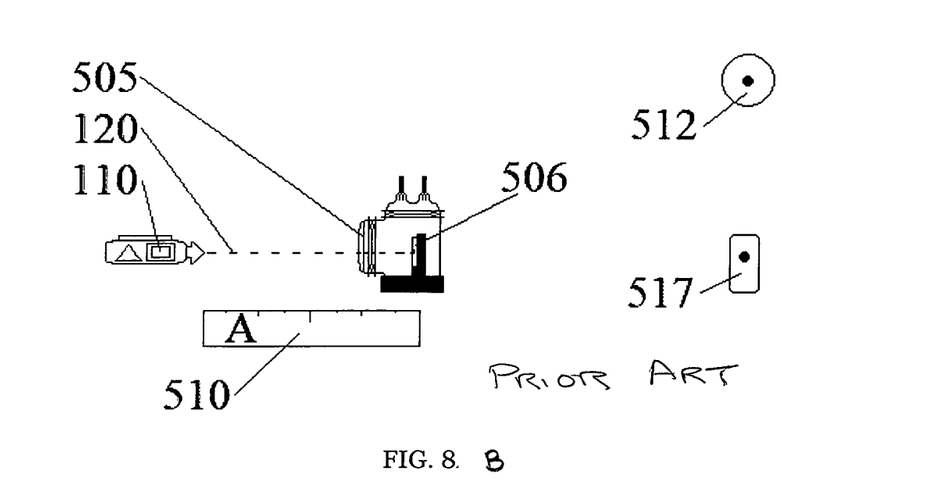

Directed energy beam 120 also has a narrow area of concentration on test samples 140 and 506 as shown by patterns 516 and 517 respectively. This narrows the concentration of energy on the test sample and can produce acceptable test results, but at the cost of damaging the optical window.

Figure 8C:
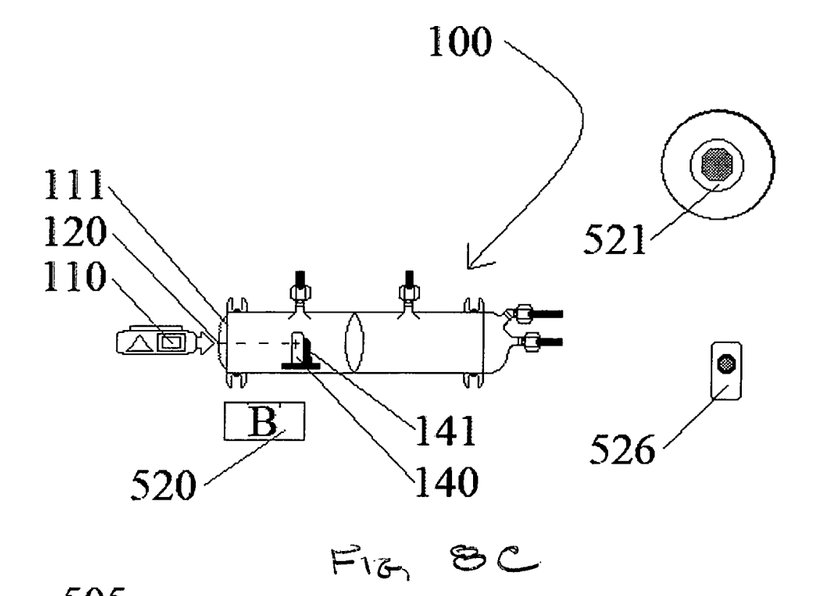
FIGS. 8C and 8D are partial, side-views of an environmental chamber according to an embodiment of the present invention, as well as the prior art test chamber of FIG. 1, further illustrating differences in distance modifications and results.
Figure 8D:
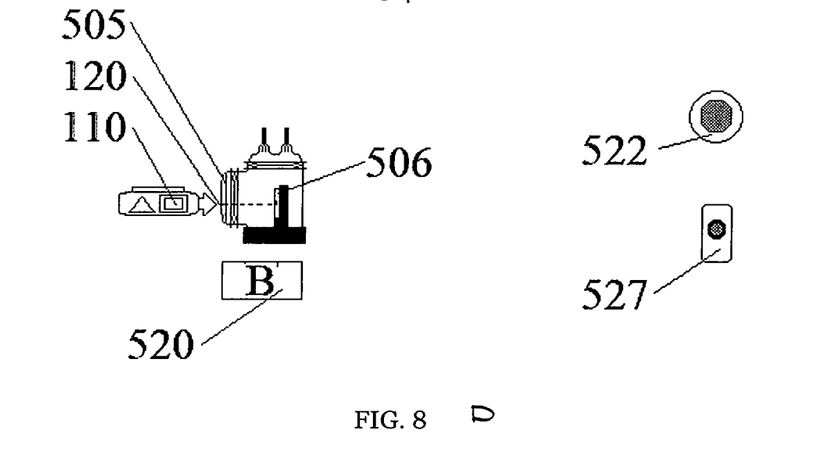

In the comparative example of FIGS. 8C and 8D, ablation tool 110 is located at the second distance B nearer to the optical window than in distance A in this configuration, a wide dispersion of directed energy 120 passes through optical window 111 preventing damage, as shown by the pass-through focus 521 pattern. In the prior art device 2 optical window 505 also receives wide dispersion of directed energy 120 as shown in pass-through focus 522. Neither windows 111 nor 505 receive any damage. Both test sample plates 140 and 506 each receive a low concentration of directed energy 120 as shown in test focus 526 and 522. The directed energy fails to interact properly with the test sample producing less reliable test results. Thus, while the optical window is saved, this configuration provides poor test data.

Figure 8E:
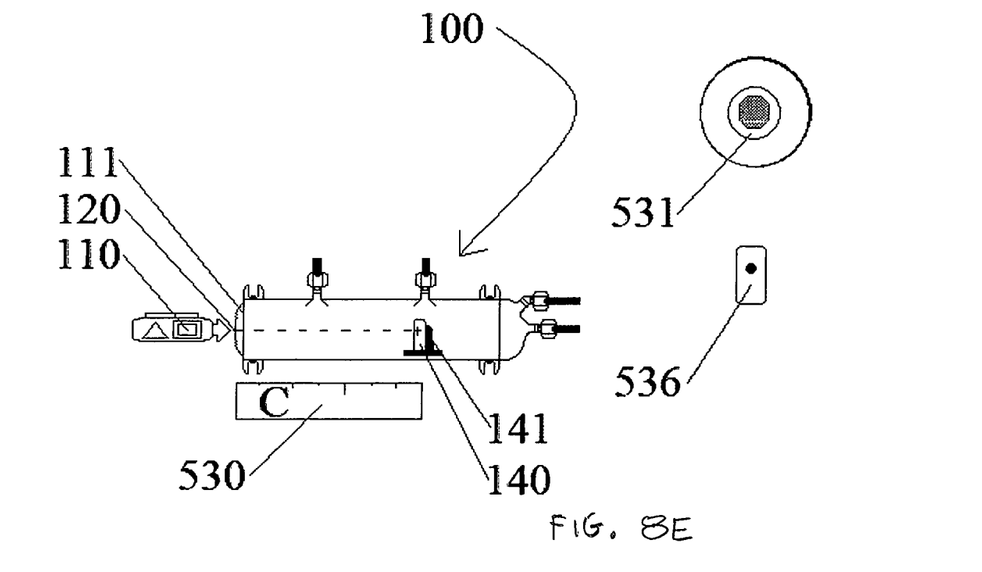
FIGS. 8E and 8F are partial, side-views of an environmental chamber according to an embodiment of the present invention, as well as the prior art test chamber of FIG. 1 further illustrating differences in distance modification and results.
Figure 8F:
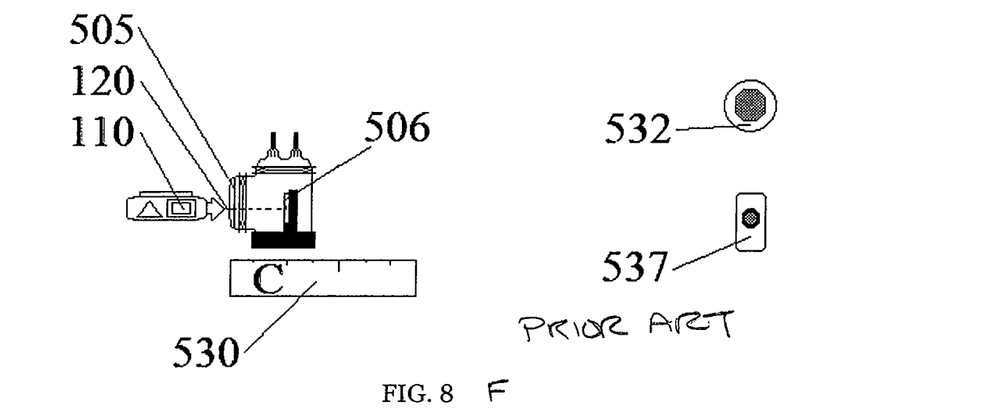

FIGS. 8E and 8F compare performances of environmental chamber 100 and prior art vessel 2 when ablation too 110 is located closest to environmental chamber 100 at distance C. In this configuration, a wide dispersion of directed energy 120 passes through optical windows 111 and 505 as illustrated by focus patterns 531 and 532 respectively. However, the pattern 536 configurable positioning of test sample plate 140 allows sample 140 to be positioned such that energy 120 produces a medium concentration of which yields an accurate and reliable test process and results. In contrast, in prior art vessel 2, directed energy 120 is of low concentration at sample plate 506 as shown by in test focus pattern 537. In the prior art device, no beneficial adjustment can be made by relocating the test sample within the device and correspondingly poor test results are produced.

Figure 8G:
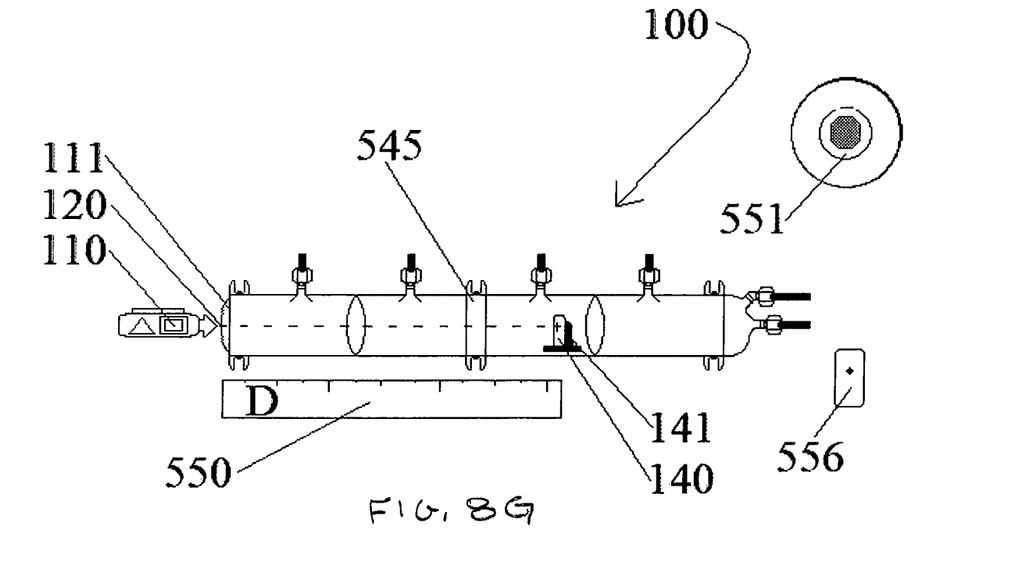
FIGS. 8G and 8H are partial, side-views of an environmental chamber according to an embodiment of the present invention, as well as the prior art test chamber of FIG. 1 further illustrating differences in configuration and results.
Figure 8H:
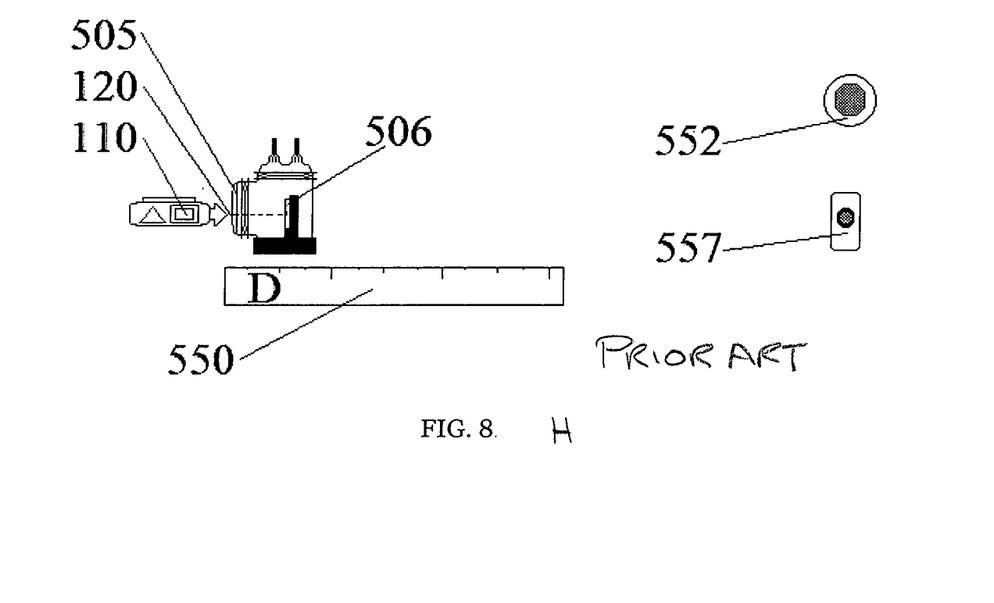

FIGS. 8G and H shows yet another comparative example between environmental chamber 100 and prior art vessel 2. In FIG. 8G a third clamp assembly 545 provides expansion of environmental chamber 100, increasing its overall length. With ablation tool 110 at distance D which is of same or similar distance as distance C of FIG. 8E, a wide dispersion of directed energy 120 passes through optical window 111, as illustrated by pass-through focus 551 and 552. Test sample plate 140 receives a high concentration of directed energy 120, shown by test focus pattern 556, which results from the benefit of an adjustable test area within the elongated tube of chamber 100. Prior art vessel 2 lacks this configurable feature. Directed energy 110 is of low concentration at sample plate 506. The test sample location cannot be adjusted to train and concentrate the energy on sample 506 in such a manner as to properly ablate the material and produce the most reliable test results.

The environmental test chamber of the present invention thus allows the directed energy to be concentrated on the test sample in the manner best able to produce reliable and trustworthy test results. The distance of the test sample from the energy source can be manipulated by moving the sample location within the chamber 100, with the desired position being a function of the type of energy used and the characteristics of the material tested.

The range of positions at which the test sample can be located can be further expanded by adding additional sections to make up chamber 100. Expanding the length of chamber 100 not only allows for additional positions for test sample 104 but can also facilitate management of fluid circulation within the chamber. Managing the circulation within the chamber controls the turbidity of the flow and better management of the accuracy of test results. Managing the circulation and flow rates within the chamber also helps prevent clogging of the inlet and outlet ports.

Embodiments and advantages of the present invention have now been described. The subject matter defined in the appended claims is not necessarily limited to the specific features or acts described above. Rather, the specific features and acts are disclosed as example forms of implementing the claims. Many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An environmental test apparatus, comprising:
   a hollow cylinder having first and second ends, the hollow cylinder comprising an elongated tube, wherein the hollow cylinder further comprises a first and second section and a means for joining the second section to the first section, wherein the means for joining the second section to the first section includes a fusion weld;
   an exit port, the exit port located along the circumference and length of the hollow cylinder;
   an input port;
   an optical window removably coupled to the hollow cylinder at the first end;
   a first clamp adapted to removably secure the optical window to the first end of the hollow cylinder, the optical window adapted to be removed when the first clamp is unclamped;
   an endcap removably coupled to the hollow cylinder at the second end;
   a second clamp adapted to removably secure the endcap to the second end of the hollow cylinder, the endcap removably coupled to the hollow cylinder at the second end via the second clamp; the endcap adapted to be removed when the second clamp is unclamped, the second end of the hollow cylinder adapted to removably couple a third section adapted to extend the elongated tube; and,
   a test sample mount located within an interior volume of the hollow cylinder, the test sample mount adapted to be moved and positioned at one of a plurality of distances from the optical window.

2. The environmental test apparatus of claim 1, wherein the hollow cylinder further comprises a plurality of exit ports, wherein the exit port comprises one of the plurality of exit ports.

3. The environmental test apparatus of claim 1, wherein the hollow cylinder further comprises a first exit port located on a top surface of the hollow cylinder and a second exit port located on a bottom surface of the hollow cylinder.

4. The environmental test apparatus of claim 1, wherein the hollow cylinder further comprises a plurality of exit ports located at various positions along the circumference and length of the hollow cylinder, wherein the exit port comprises one of the plurality of exit ports.

5. The environmental test apparatus of claim 1, wherein the hollow cylinder includes a plurality of input ports, wherein the input port comprises one of the plurality of input ports.

6. The environmental test apparatus of claim 1, wherein the optical window further comprises a lens with a predetermined focal length.

7. The environmental test apparatus of claim 1, wherein the optical window further comprises a transparent material configured to diffuse energy transmitted from a source exterior to the hollow cylinder.

8. The environmental test apparatus of claim 1, wherein the hollow cylinder is composed of glass.

9. The environmental test apparatus of claim 1, wherein the endcap further comprises a plurality of ports.

* * * * *